US006895834B1

(12) United States Patent
Baatz

(10) Patent No.: US 6,895,834 B1
(45) Date of Patent: May 24, 2005

(54) ADJUSTABLE CRANK FOR BICYCLES

(75) Inventor: Wilfried Baatz, Seattle, WA (US)

(73) Assignee: Racer-Mate, Inc., Seattle, WA (US)

( * ) Notice: Subject to any disclaimer, the term of this patent is extended or adjusted under 35 U.S.C. 154(b) by 10 days.

(21) Appl. No.: 10/679,242

(22) Filed: Oct. 3, 2003

Related U.S. Application Data

(60) Provisional application No. 60/416,493, filed on Oct. 4, 2002.

(51) Int. Cl.$^7$ .............................................. G05G 1/16
(52) U.S. Cl. ..................................... 74/594.3; 280/259
(58) Field of Search ..... 280/259–262; 74/594.1–594.3

(56) References Cited

U.S. PATENT DOCUMENTS

| | | | | |
|---|---|---|---|---|
| 5,161,430 A | * | 11/1992 | Febey ........................ | 74/594.1 |
| 5,458,022 A | * | 10/1995 | Mattfeld et al. ........... | 74/594.1 |
| 5,566,590 A | * | 10/1996 | Wan .......................... | 74/594.3 |
| 5,653,150 A | * | 8/1997 | Gignoux .................... | 74/594.1 |
| 5,879,017 A | * | 3/1999 | Debruin .................... | 280/259 |
| 6,474,193 B1 | * | 11/2002 | Farney ....................... | 74/594.3 |
| 6,589,139 B1 | * | 7/2003 | Butterworth ............... | 74/594.3 |
| 6,640,662 B1 | * | 11/2003 | Baxter ....................... | 74/594.3 |

* cited by examiner

*Primary Examiner*—Lesley D. Morris
*Assistant Examiner*—Matthew Luby
(74) *Attorney, Agent, or Firm*—Christensen O'Connor Johnson Kindness PLLC

(57) ABSTRACT

A crank arm of a bicycle having an effective crank arm length that can be selectively adjusted for increasing the comfort and performance of the rider. The crank arm includes a crank arm member rotatably connected about a crank arm member rotational axis to a base member. The base member includes a spindle bore defining a spindle rotational axis, which is eccentric with respect to the crank arm member rotational axis. The opposite end of the crank arm member includes a pedal bore defining a pedal rotational axis. The crank arm further includes a fastener to selectively couple the base member to the crank arm member for rotation therewith.

16 Claims, 11 Drawing Sheets

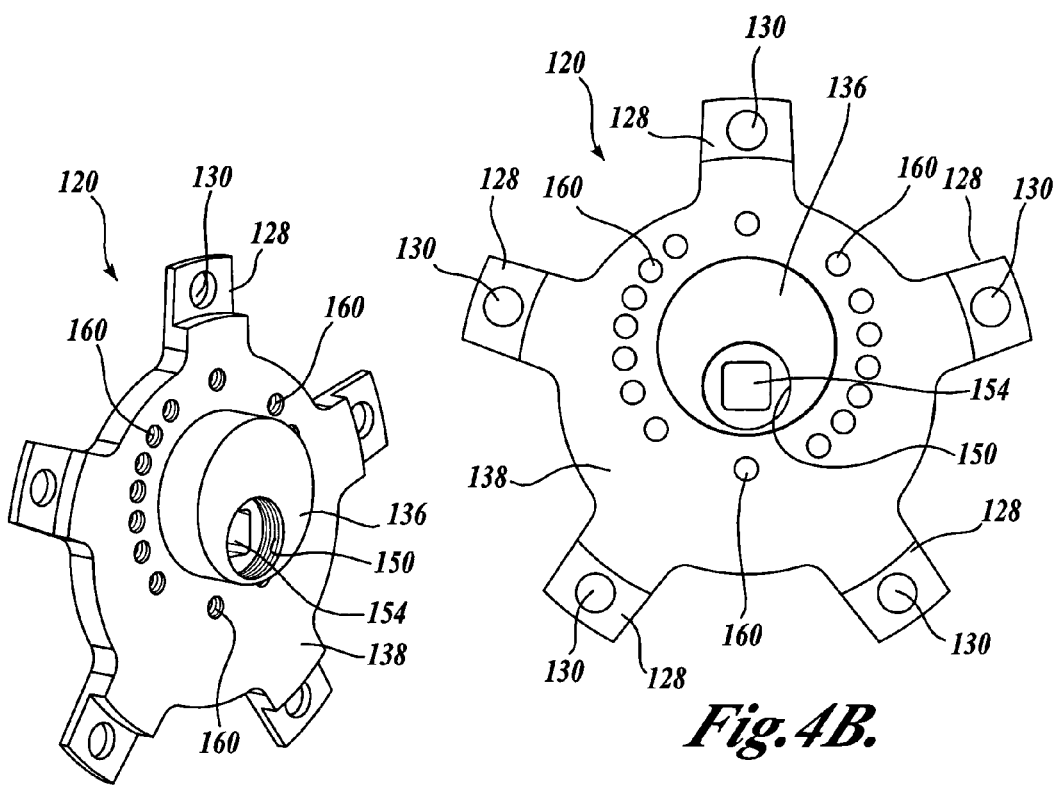
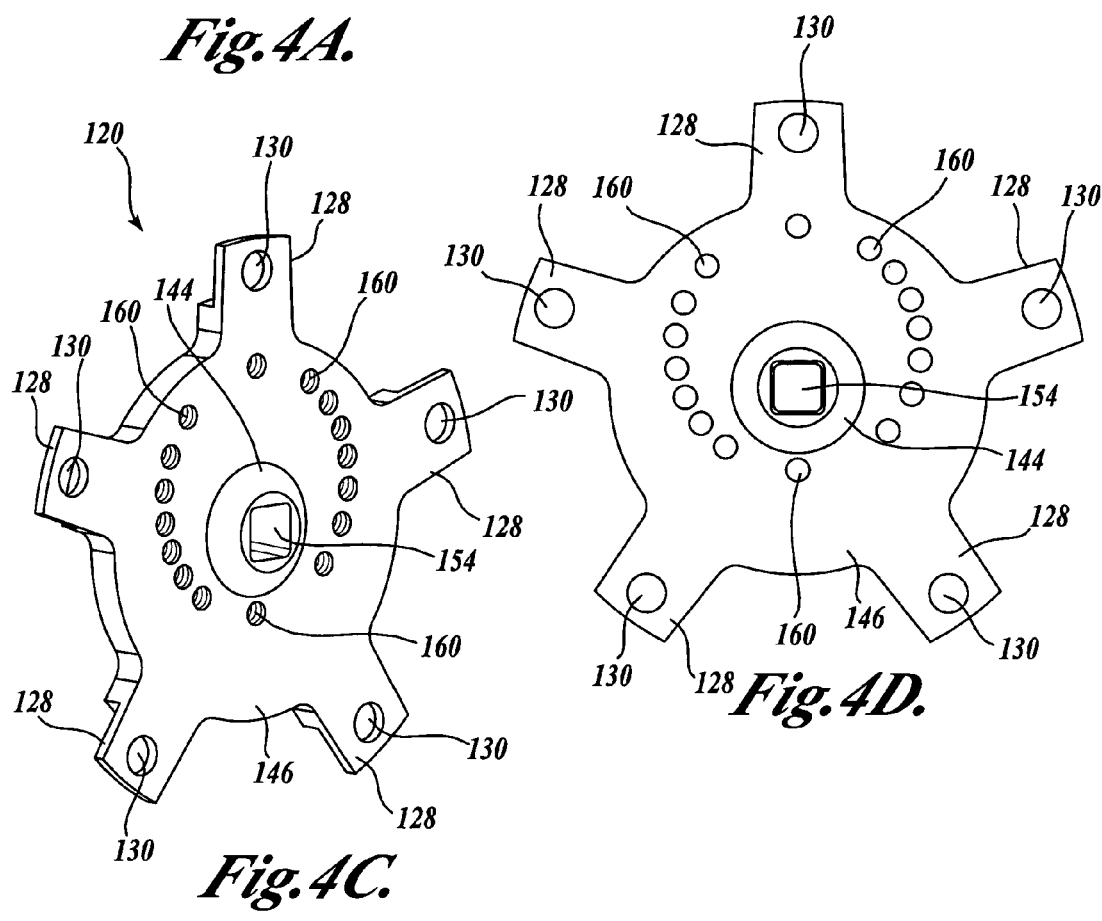

ADJUSTABLE CRANK FOR BICYCLES

CROSS-REFERENCE TO RELATED APPLICATION

This application claims the benefit of U.S. Provisional Application No. 60/416,493, filed Oct. 4, 2002, the disclosure of which is expressly incorporated by reference.

FIELD OF THE INVENTION

The present invention relates generally to transmissions, and more particularly, to crank arms of crank assemblies for bicycles.

BACKGROUND OF THE INVENTION

Cycling is a very popular activity for both recreational riders and racing enthusiasts alike. Professional cyclists and triathletes are earning large sums of money through races, sponsorships, and advertisements. For these individuals, bicycle configuration, including frame size, frame geometry, and crank arm length, is an important aspect for proper efficiency and comfort. While there as been various improvements to the bicycle in recent years, there has never been an easy and efficient method for determining the optimal crank arm length for a specific rider.

Currently, a rider either purchases a bicycle with any one of a variety of standard crank arm lengths, including 170 mm and 175 mm crank arm lengths, or orders the bicycle with his/her preferred crank arm length. When a rider wishes to change the length of the crank arms of a bicycle crankset, the rider must begin the labor intensive and time consuming task of removing the crank arms from the spindle, and reattaching a different length set of crank arms to the spindle. To select another crank arm length, the rider must repeat the process. If the rider wishes to try a non-standard size, the rider must have the crank arms fabricated, which takes many months to receive, and is extremely expensive.

Further, with the advent of stationary bicycle resistance trainers and classes such as spinning available at indoor exercise facilities, riders, particularly competitive athletes, wish to duplicate their bicycle configuration, including crank arm length, when training indoors to more closely simulate outdoor training. Currently, no easy method for duplicating their crank arm lengths on stationary bicycle resistance trainers exists.

Thus, there is a need in the bicycle industry for an easy method of adjusting the length of crank arms, while also providing for non-standard crank arm lengths. The present invention is directed to such a system and method.

SUMMARY OF THE INVENTION

In accordance with one embodiment of the present invention, an adjustable length crank arm is provided. The crank arm includes a first member having a spindle bore sized and configured to be connectable to a spindle and defining a spindle rotational axis. The crank arm further includes an elongate second member rotatably connected at one end to the first member and having a mounting bore disposed at the opposite end of the second member. The mounting bore is adapted to be connected to a pedal shaft and defines a pedal rotational axis spaced a distance X from the spindle rotational axis and parallel therewith. The second member is selectively rotatable between at least two pre-selected positions about a rotational axis eccentric with respect to the spindle rotational axis. The pre-selected positions of the second member vary the distance X between the spindle rotational axis and the pedal rotational axis.

In accordance with another embodiment of the present invention, a crank arm having an adjustable effective length is provided. The crank arm includes a base member having a cylindrically shaped first boss, and a spindle bore sized and configured to be connectable to a spindle and defining a spindle rotational axis parallel and eccentric to an axis of the first boss. The crank arm also includes an elongate crank arm member journaled for rotation onto the first boss at one end and having a mounting bore disposed at the other end adapted to be connected to a pedal shaft and defining a pedal rotational axis spaced apart a distance from the spindle rotational axis and parallel therewith. The spaced apart distance defines an effective length of the crank arm. The crank arm member is operable to be selectively rotated between a plurality of pre-selected positions about the axis of the first boss, and further operable to be selectively connected to the base member for rotation therewith. The effective length of the crank arm is adjustable as the crank arm member rotates between the plurality of pre-selected positions.

In accordance with yet another embodiment of the present invention, an adjustable length crank arm is provided. The adjustable length crank arm includes a disk shaped base member having a spindle facing side and a crank arm member facing side. The base member includes a cylindrically shaped first boss having a cylindrical open cavity. The base member further includes a spindle through bore connected to the cavity. The spindle through bore is adapted for receiving a spindle in a non-rotational manner and defines a spindle rotational axis. The base member further includes at least two through bores having centers disposed radially outward of the perimeter of the first boss and centered on an imaginary circle having a pre-selected diameter. The crank arm also includes a crank arm member having a spindle end and a pedal end. The spindle end of the crank arm member defines a cylindrical bore sized and configured for rotatably mounting the crank arm member onto the first boss and includes at least one fastener through bore. The pedal end of the crank arm member defines a through bore adapted to be connected to a pedal shaft and defines a pedal rotational axis spaced a distance D from the spindle rotational axis. The crank arm member is rotatable about the first boss for selectively aligning the fastener through bore with one of the base member through bores. The rotation of the crank arm member selectively changes the distance D. The crank arm further includes at least one fastener received through the aligned fastener through bore and one of the base member through bores for selectively coupling the base member to the crank arm member for rotation therewith.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

The foregoing aspects and many of the attendant advantages of this invention will become more readily appreciated by reference to the following detailed description, when taken in conjunction with the accompanying drawings, wherein:

FIG. 4A is a front perspective view of the base member of the right crank arm shown in FIG. 2;

FIG. 4B is a front elevational view of the base member of the right crank arm shown in FIG. 2;

FIG. 4C is a rear perspective view of the base member of the right crank arm shown in FIG. 2;

FIG. 4D is a rear elevational view of the base member of the right crank arm shown in FIG. 2;

DETAILED DESCRIPTION OF THE PREFERRED EMBODIMENT

The present invention will now be described with reference to the accompanying drawings where like numerals correspond to like elements. The present invention is directed to an apparatus for a bicycle or like device for increasing the overall comfort and performance of the rider during use. More specifically, the present invention is directed to an adjustable length crank arm for easily and effectively adjusting the effective crank arm length of a bicycle. While the adjustable length crank arm of the present invention is described herein for use with a bicycle, it will be appreciated that the adjustable length crank arm may be practiced with other crank transmissions, such as the crank assemblies of stationary bicycle exercise trainers. Thus, the following description relating to bicycles is meant to be illustrative and not limiting the broadest scope of the inventions, as claimed.

Figure 1:
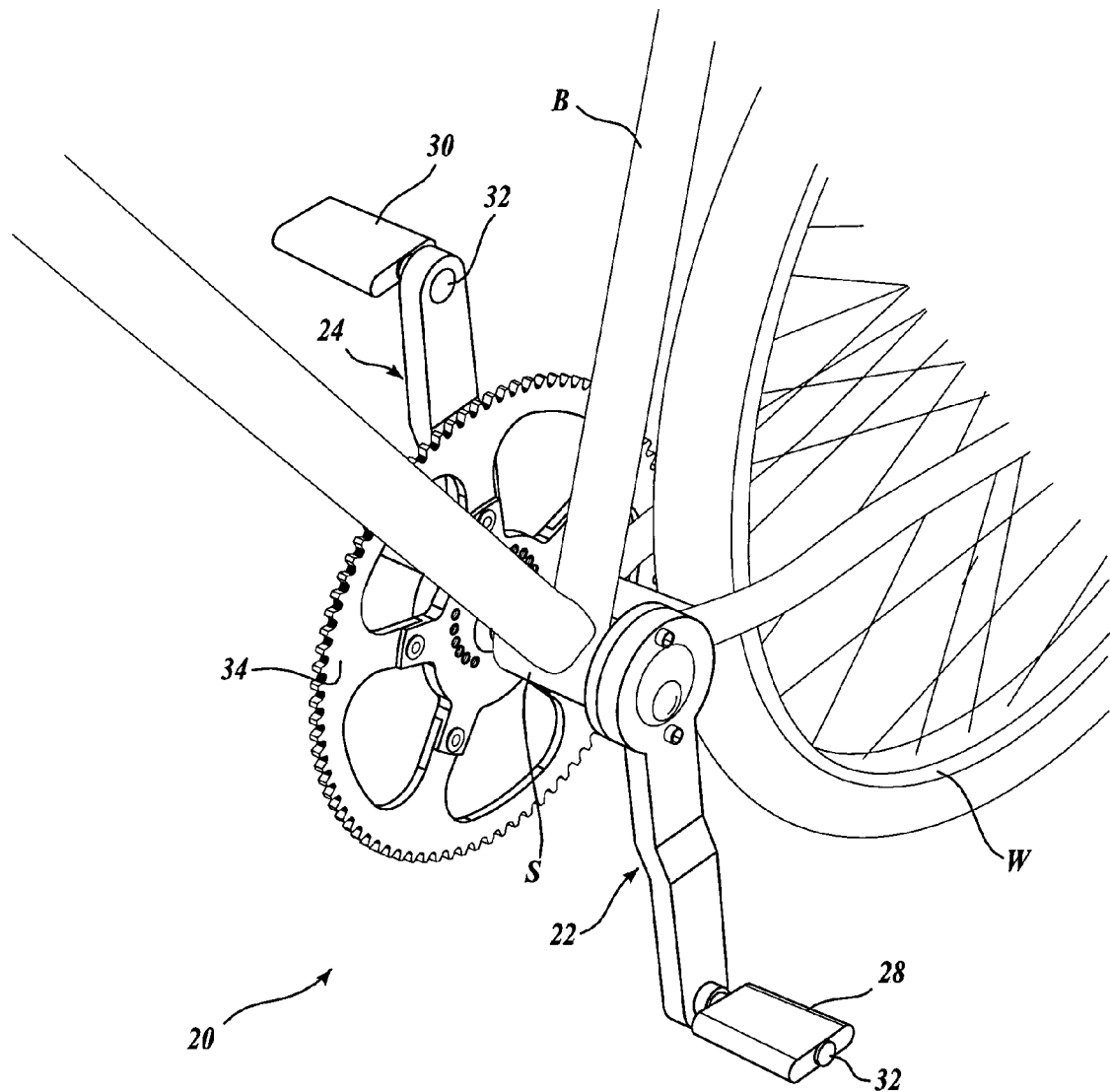
FIG. 1 is a partial perspective view of a bicycle to which crank arms constructed in accordance with the present invention are mounted.

FIG. 1 illustrates a partial perspective view of a crank assembly 20 operably connected to a bicycle B. Generally described, the crank assembly 20 includes an axle (not shown), generally referred to as a spindle, that is mounted within a bottom bracket shell S of the bicycle B for rotation about a spindle rotational axis. Left and right crank arms 22 and 24 are attached at opposite ends of the spindle for rotation therewith. For clarity in the description, the terms "left" and "right" are used herein to denote the left and right sides of a rider when mounted on the bicycle in the typical riding position, and therefore, should not be considered as limiting the scope of the present invention. Left and right pedals 28 and 30 are rotatably attached via pedal shafts 32 to the ends of left and right cranks arms 22 and 24, respectively. Attached for rotation with the right crank arm 24 is at least one chain ring 34. The chain ring 34 is configured to connect to a chain (not shown) that couples the chain ring 34 to the rear wheel W through a conventional rear sprocket arrangement (not shown) so that rotation of the pedals 28 and 30 generated by the rider is transmitted to the rear wheel W.

Figure 2:
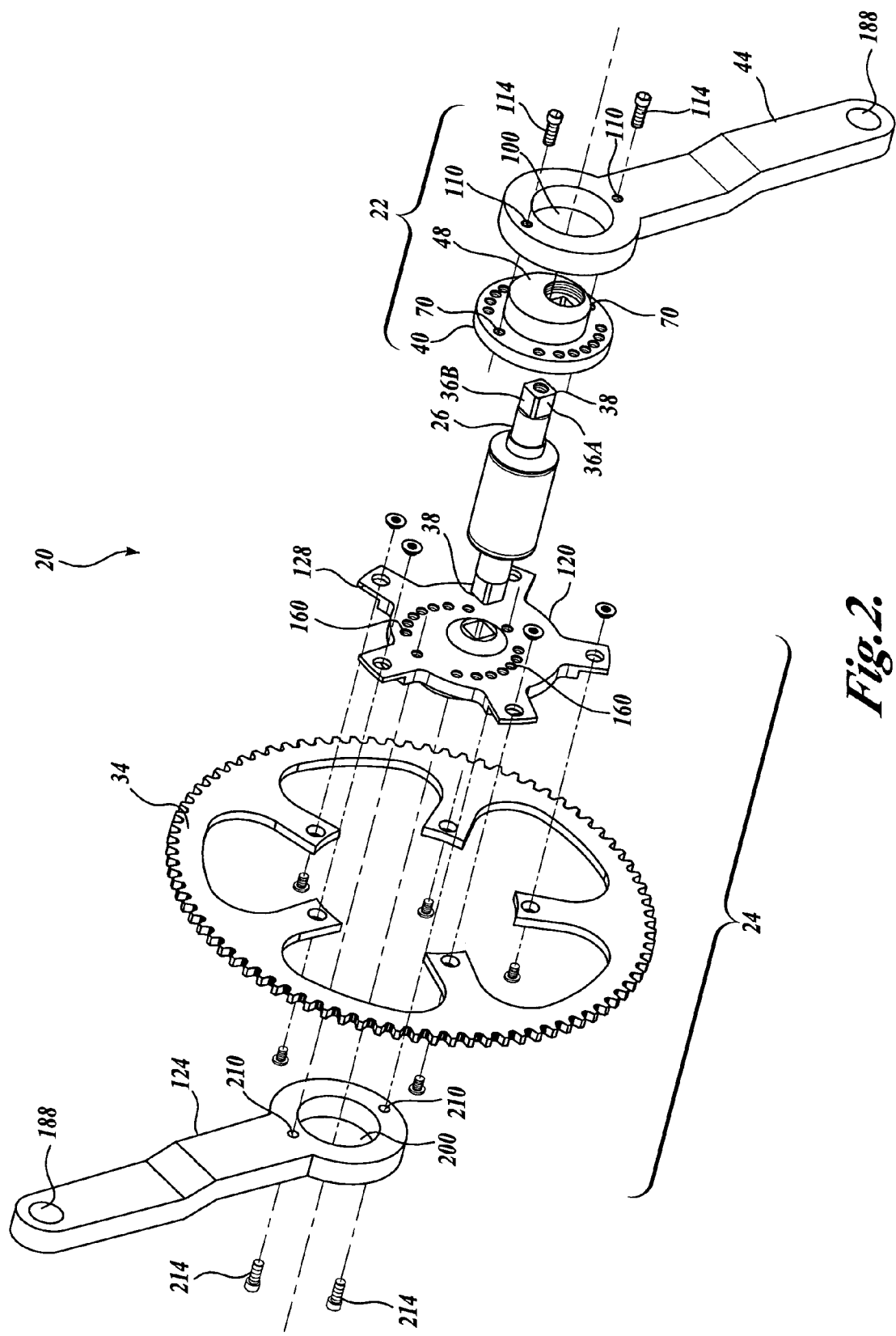
FIG. 2 is an exploded view of the crank assembly of FIG. 1.
Figure 3A:
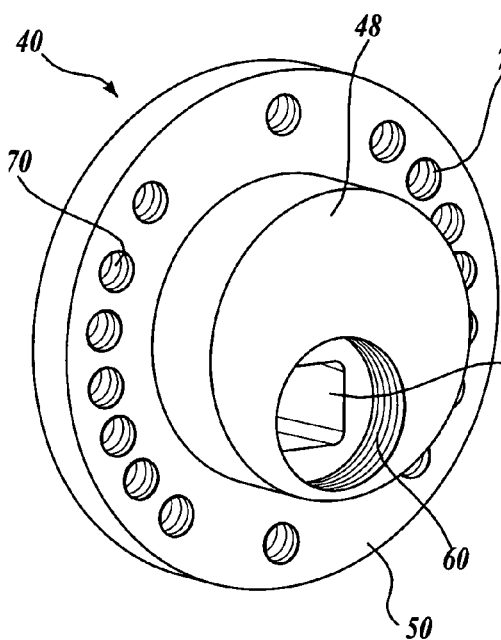
FIG. 3A is a front perspective view of the base member of the left crank arm shown in FIG. 2.
Figure 3B:
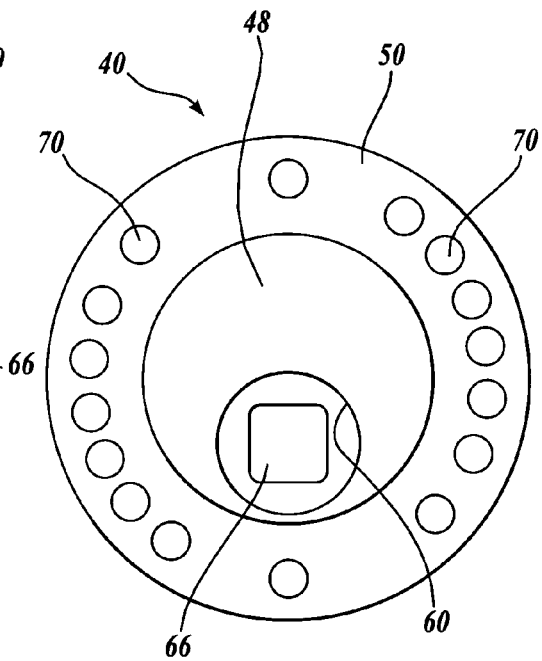
FIG. 3B is a front elevational view of the base member of the left crank arm shown in FIG. 2.
Figure 3C:
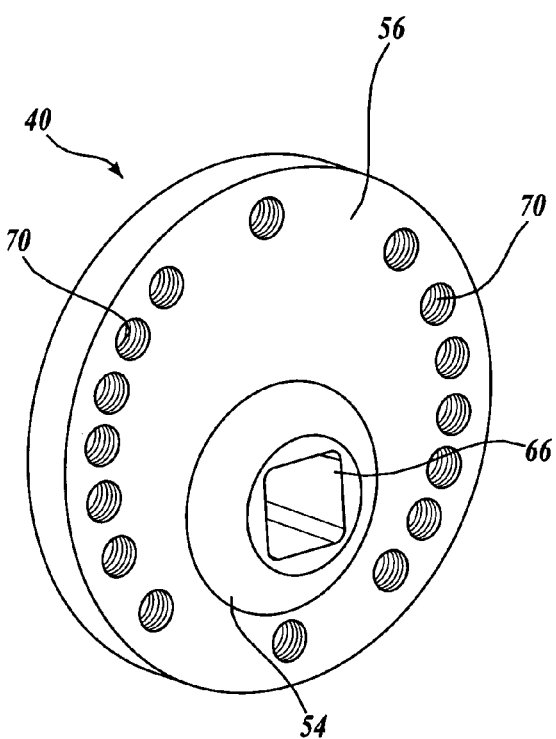
FIG. 3C is a rear perspective view of the base member of the left crank arm shown in FIG. 2.
Figure 3D:
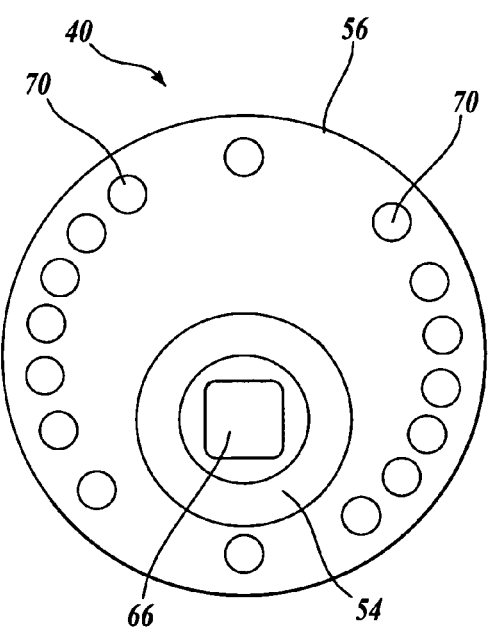
FIG. 3D is a rear elevational view of the base member of the left crank arm shown in FIG. 2.

Suitable embodiments of a left and right adjustable length crank arms ("crank arms 22 and 24") constructed in accordance with aspects of the present invention are illustrated in FIG. 2. FIG. 2 is an exploded perspective view of the crank assembly 20 illustrating the crank arms 22 and 24 and the spindle 26 (shown mounted in a convention bottom bracket). The spindle 26 has four flats 36A–36D (36C and 36D are not shown) machined at a slight angle on each end of the spindle 26 forming tapered square protrusions 38. The tapered square protrusions 38 are adapted to fixedly attached to the crank arms 22 and 24, respectively, by pressing the tapered square protrusions into cooperatively sized and shaped spindle bores of each crank arm. A nut or bolt (not shown) may be tightened against the outer portion of the crank arms 22 and 24 to hold the crank arms onto the spindle 26 as is known in the art. The spindle 26 is a standard sized, conventional spindle, and thus, will not be described in any more detail.

Referring now to FIGS. 2, 5, 6, and 7, the crank arms 22 and 24 will be described in more detail. Crank arm 22 includes a left base member 40 ("base member 40") and a left crank arm member 44 ("crank arm member 44"), as shown best in FIGS. 2, 5, and 7. In the embodiment shown in FIGS. 3A–3D, the base member 40 is disc-shaped, having a cylindrically shaped first boss 48 protruding from the crank arm member side 50 of base member 40 and a frusto-conically shaped second boss 54 protruding from the spindle side 56 of base member 40. The first boss 48 is concentrically arranged on the base member 40 and includes a threaded cylindrical cavity 60, which is eccentric with respect to the first boss 48. The cavity 60 extends approximately halfway into the first boss 48, where it connects and is coaxial with a spindle-mounting bore 66 that extends into the base member 40 and exits through the center of the second boss 54. The spindle-mounting bore 66 is sized and configured to receive one of the spindle protrusions in an anti-rotational manner. Thus, the spindle-mounting bore 66 defines a spindle rotational axis 94 (see FIG. 5). The base member 40 further includes a plurality of through bores 70, which are shown threaded, positioned around the periphery of the base member 40, radially outward of the first and second bosses 48 and 54, respectively. The positioning of the through bores 70, which determine the effective length of the crank arm 22 (FIG. 2), will be described in more detail below.

Figure 5:
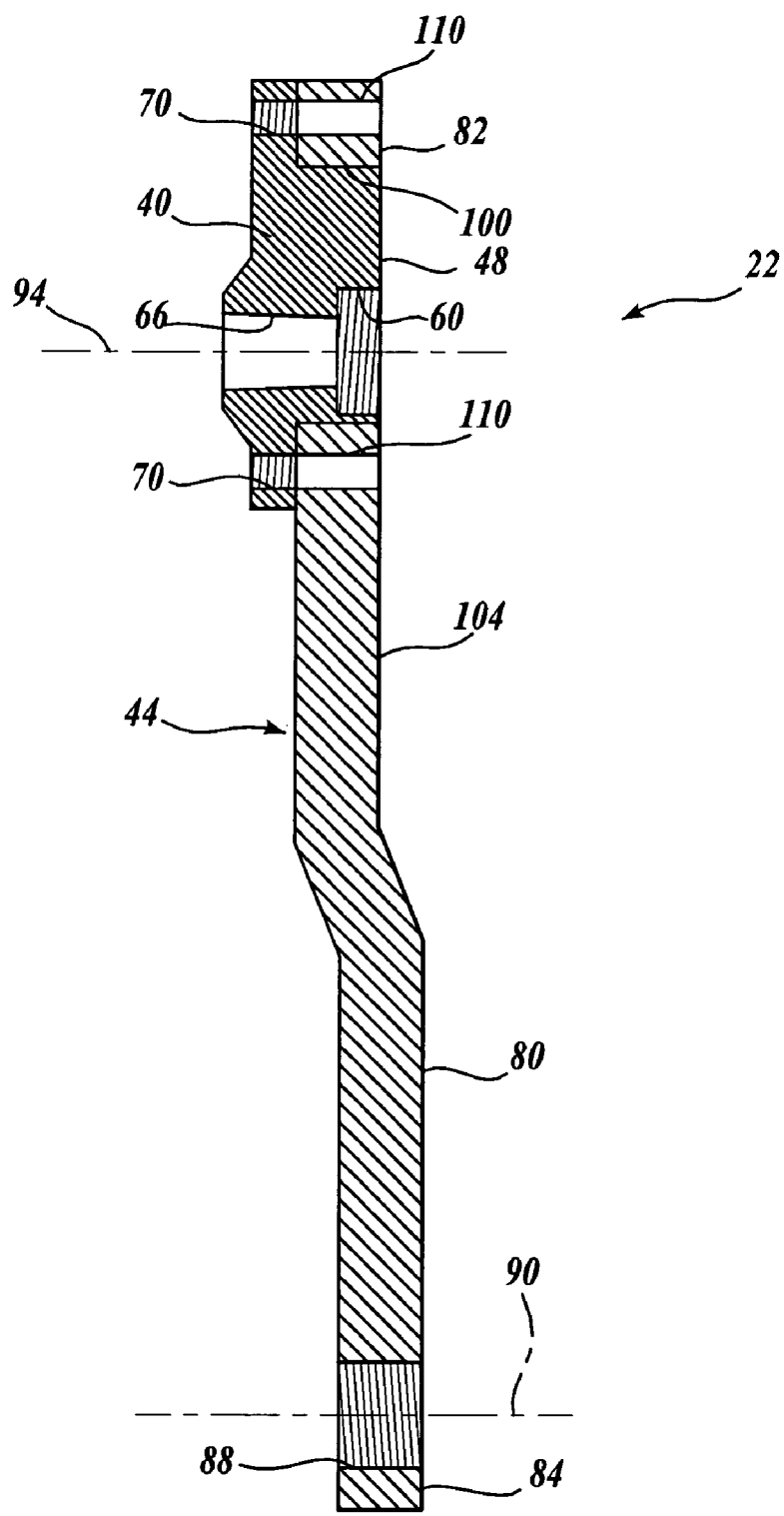
FIG. 5 is a cross-sectional view of the left crank arm of FIG. 2.
Figure 7:
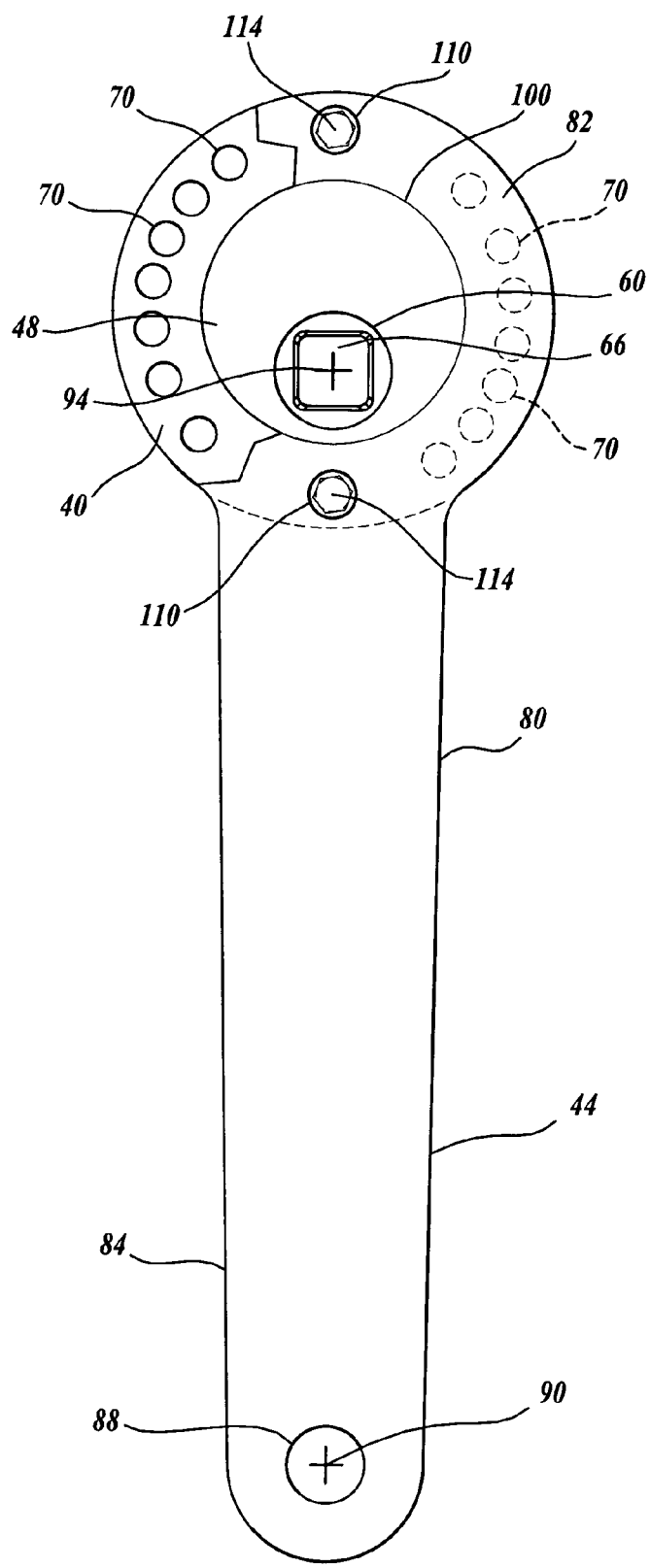
FIG. 7 is a front elevational view of the left crank arm of FIG. 2.

Referring now to FIGS. 2, 5, and 7, the crank arm member 44 is formed as an elongate body 80 having a spindle end 82 and a pedal end 84. The pedal end 84 of the crank arm member 44 includes a pedal shaft through bore 88 to which a pedal shaft of a pedal is mounted. As such, the pedal shaft through bore 88 defines a pedal rotational axis 90. When assembled, as best shown in FIG. 5, the pedal rotational axis 90 of the pedal shaft through bore 88 is parallel with the spindle rotational axis 94. At the spindle end 82 of the crank arm member 44, there is formed a cylindrical aperture 100 sized and configured for receiving the first boss 48 of the base member 40 in a rotationally seated or journaled manner.

In the embodiment shown in FIG. 5, the thickness of the crank arm member 44 at the spindle end 82 is such that the outer side surface 104 of the crank arm member 44 is flush with the first boss 48 when rotationally seated thereto. As best shown in FIG. 7, the crank arm member 44 further includes two fastener through bores 110 centered on an imaginary circle having a pitch crank diameter (PCD), the imaginary circle positioned radially outward of the aperture 100. The two fastener through bores 110 are also aligned with the longitudinal axis of the crank arm member 44, as best shown in FIG. 7. The diameter of the two fastener through bores 110 are substantially identical to the plurality of through bores 70 in base member 40.

In operation, to rotationally lock the crank arm member 44 to the base member 40, the crank arm member 44 is rotated until the two fastener through bores 110 are aligned with two of the plurality of through bores 70, as shown in FIGS. 5 and 7, and then fastened together by routing removable fasteners 114, shown in FIGS. 2 and 7, such as bolts or detent pins, through the aligned through bores 110 and 70. It will be appreciated that the through bores 70 of the base member 40 can either be threaded, as shown in the FIGS. 2, 3A, 3C, and 5, or unthreaded, in which a nut can be used to secure the bolt therethrough.

Turning now to FIGS. 2, 4A–4D, and 6, the crank arm 24 will now be described. The crank arm 24 includes a right base member 120 ("base member 120") and a right crank arm member 124 ("arm member 124"). In the embodiment shown in FIGS. 4A–4D, the base member 120 is substantially disc-shaped, having a plurality of arms 128 positioned equidistant around its perimeter and projecting radially outward from the center thereof. The arms 128 include through bores 130 for connecting to the chain ring. It will be appreciated that the base member 120 may be configured so that multiple chain rings of differing diameters may be attached to the arms 128.

The base member 120 includes a cylindrically shaped first boss 136 protruding from the crank arm member side 138 of base member 120, and a frusto-conically shaped second boss 144 protruding from the spindle side 146 of base member 120. The second boss 144 is concentrically arranged on the base member 120, while the first boss 136 is positioned offset or eccentric with respect to the base member 120. The first boss 136 includes a threaded cylindrical cavity 150, which is eccentric with respect to the first boss 136, but concentric with the base member 120. The cavity 150 extends approximately halfway into the first boss 136, where it connects with a spindle-mounting bore 154 that extends into the base member 120 and exits through the center of the second boss 144. The spindle-mounting bore 154 is concentric with respect to the base member 120, and is sized and configured for receiving one of the spindle protrusions in an anti-rotational manner. Thus, the spindle-mounting bore defines a spindle rotational axis 194, which is coaxial with the spindle rotational axis of the left crank arm. The base member 120 further includes a plurality of through bores 160, which are shown threaded, positioned radially outward of the perimeter of first boss 136. The positioning of the through bores 160, which determine the effective length of the crank arm 124, will be described in more detail below.

Figure 6:
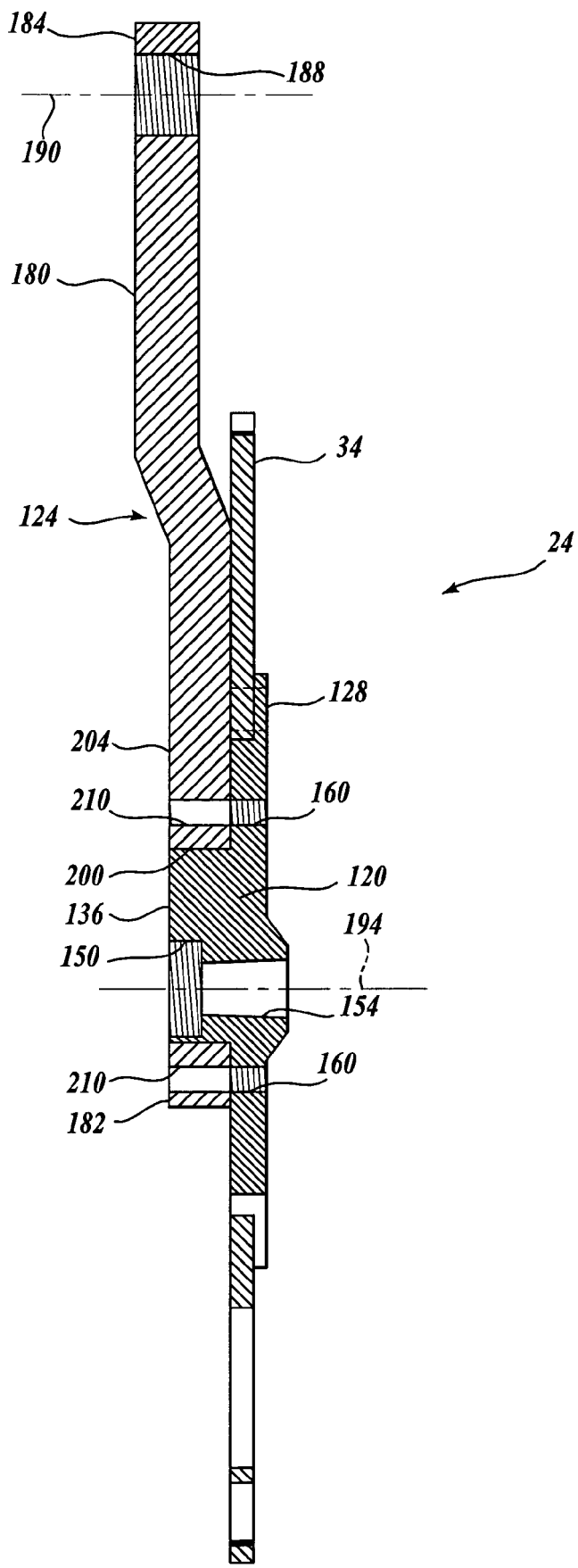
FIG. 6 is a cross-sectional view of the right crank arm of FIG. 2.

Referring to FIG. 6, the crank arm member 124 is substantially identical to the crank arm member 44 (FIG. 5) in materials, construction, and operation. As best shown in FIG. 6, the crank arm member 124 is formed as an elongate body 180 having a spindle end 182 and a pedal end 184. The pedal end 184 of the crank arm member 124 includes a pedal shaft through bore 188 to which a pedal shaft of a pedal is mounted. When assembled, a pedal rotational axis 190 of the pedal shaft through bore 188 is parallel with the spindle rotational axis 194, as best shown in FIG. 6. At the spindle end 182 of the crank arm member 124, there is formed a cylindrical aperture 200 sized and configured for receiving the first boss 136 of the base member 120 in a rotationally seated or journaled manner. In the embodiment shown, the thickness of the crank arm member 124 at the spindle end 182 is such that the outer side surface 204 of the crank arm member 124 is flush with the first boss 136 when rotationally coupled thereto. The crank arm member 124 further includes two fastener through bores 210 centered on an imaginary circle having a pitch crank diameter (PCD), the imaginary circle positioned radially outward of the aperture 200. The two fastener through bores 210 are aligned with the longitudinal axis of the crank arm member 124, as best shown in FIG. 2. The diameter of the two fastener through bores 210 are substantially identical to the plurality of through bores 160 in member 120.

In operation, to rotationally lock the crank arm member 124 to the base member 120, the crank arm member 124 is rotated until the two fastener through bores 210 are aligned with two of the plurality of through bores 160, as shown in FIG. 6, and then fastened together by routing removable fasteners 214, shown in FIG. 2, such as bolts or detent pins, through the aligned through bores 210 and 160. It will be appreciated that the through bores 160 can either be threaded, as shown in the FIGS. 2, 4A, 4C, and 6, or unthreaded, in which a nut can be used to secure the bolt therethrough.

As was briefly described above with respect to the base members, the positioning of the through bores on the base members determine the effective lengths of the crank arms (i.e., the distance between the pedal rotational axis and the spindle rotational axis). The following method is one of the many possible ways of determining the positioning of these through bores. Turning now to FIGS. 8A–8D, there is shown a manufacturing sequence to form the through bores 70 in the base member 40. It will be appreciated that the method of positioning the through bores 160 of the base member 120 (FIG. 4A–4D) is substantially identical. First, an imaginary circle C having a PCD equal to the distance between the fastener through bores of the crank arm member is scribed onto the base member 40, as shown best in FIG. 8A. Next, a bisecting line BL is scribed onto the base member 40. The bisecting line BL intersects the spindle rotational axis 94 and the rotational axis RA of the crank arm member.

Figure 8A:
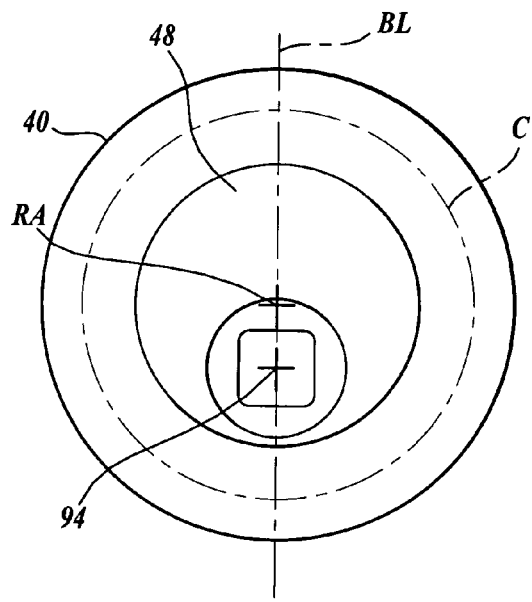
FIG. 8A–8D is a sequence depicting one method of positioning and forming the through bores in the base member.
Figure 8B:
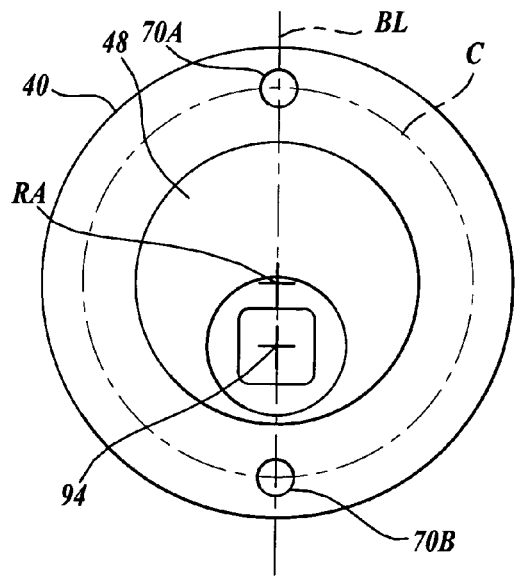
Figure 8C:
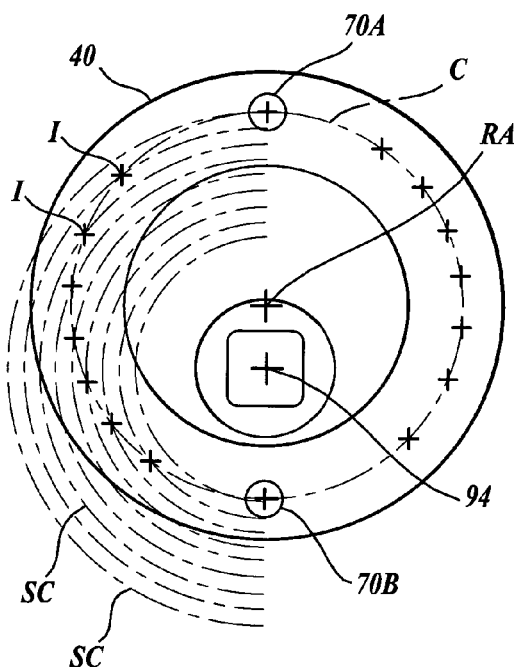
Figure 8D:
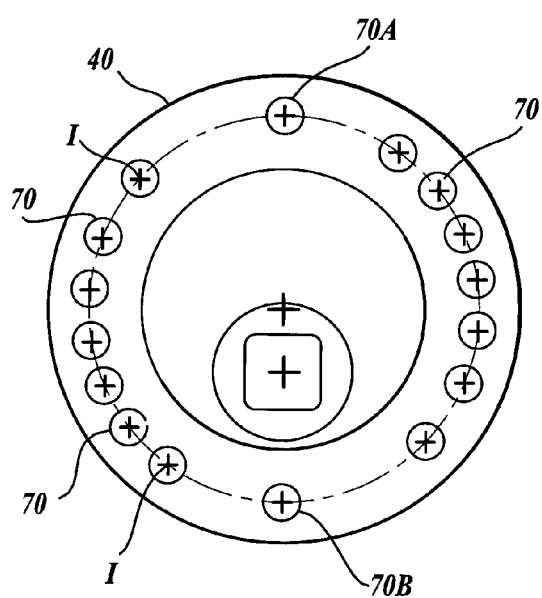

Once the circle C and the bisecting line BL are scribed, the first two through bores, designated as 70A and 70B, only in FIGS. 8B–8D, are formed, such as by drilling, at the intersection of the circle C and the bisecting line BL, as shown in FIG. 7B. Next, a plurality of semi-circles SC of differing diameters are scribed, as shown in FIG. 7C, each having their centers at the spindle rotational axis 94. The diameters of the semi-circles SC differ by the amount of incremental change desired in the adjustable crank arm. For example, in the embodiment shown, the diameters differ in the amount of 2.5 mm, thereby creating an adjustable crank arm that can incrementally change in effective length by 2.5 mm. It will be appreciated that custom lengths may be used instead of the standard 2.5 mm increments, such as 2 mm, 1.5 mm, and 3 mm, to name a few. Additionally, it will be appreciated that any number of through bores 70 may be used, as long as they can be positioned around the base member 40. As such, the number of through bores 70 determines the total number of incremental length changes that can be made by the crank arms. Further, it will be appreciated that the offset distance of the spindle rotational axis 94 from the crank arm member rotational axis RA determines one half of the total range of change in effective crank arm length. As such, the offset distance may vary in various embodiments of the present invention.

After the semi-circles SC are scribed, the remaining through bores 70 are formed, such as by drilling, at the intersections I of the circle C and the semi-circles SC, as shown in FIGS. 8C and 8D. It will be appreciated that the use of semi-circles correspond with the use of one fastener and one fastener through bore 110 in the crank arm member 44, which is an embodiment of the present invention. To create the through bores 70 for the other fastener through bore 110, shown in FIG. 5, the semi-circles would be scribed as full circles. In one embodiment, after the through bores 70 have been formed, the through bores 70 are tapped to create internal threads.

In one embodiment, the crank arms of the present invention may be selectively adjusted to change the effective length of the crank arm (i.e., the distance between the pedal rotational axis and the spindle rotational axis) from between 165 mm and 185 mm in 2.5 mm increments to coincide with the standard length of crank arms commercially available at bicycle shops. However, it will be appreciated that the present invention may be modified to change the desired effective length of the crank arms, the total range of possible effective crank arm lengths, and/or the amount of incremental change. For example, it will be appreciated that the crank arms of the present invention can be designed to have an effective crank arm length range larger or smaller than 165 mm to 185 mm, or have constant incremental changes in sizes other than the standard 2.5 mm (e.g., 1.0 mm, 1.50 mm, 1.75 mm, etc.) or varying incremental changes in effective crank arm length. For example, one varying incremental series could begin with 2.5 mm, 1.0 mm, 1.5 mm, 2.0 mm, 2.5 mm, etc.

Figure 9:
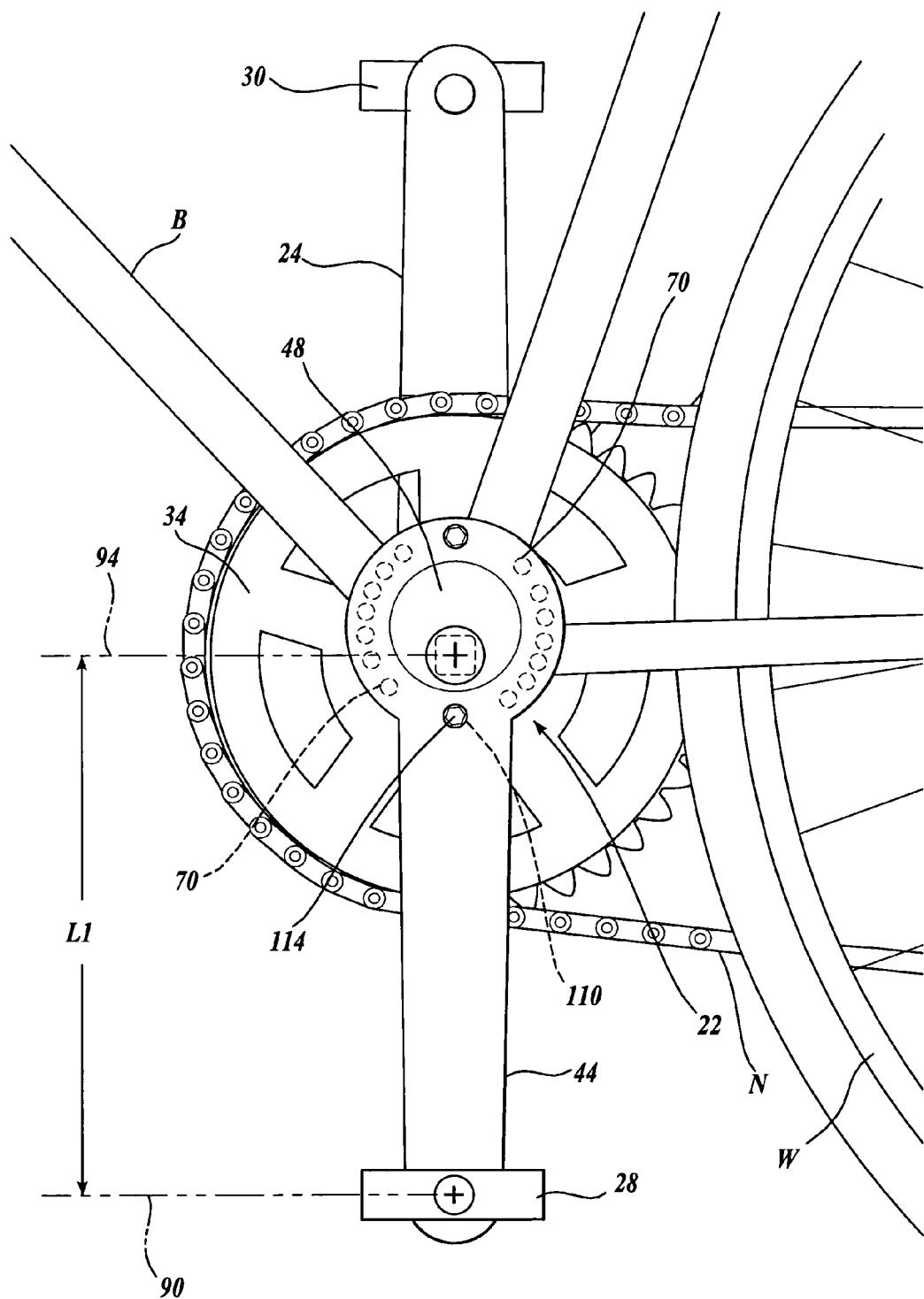
FIG. 9 is a side elevation view of a bicycle to which the crank arms of FIG. 2 are mounted, the crank arms having an effective crank arm length $L_1$.

The operation of the crank arms will now be described with reference to FIGS. 9–11. FIG. 9 is a side elevational view of a bicycle to which the crank arms 22 and 24 are rotationally mounted. For clarity in the description, crank arm 22 will be described. However, it will be appreciated that the operation of the crank arm 24 is substantially identical to that of crank arm 22. In FIG. 9, the crank arms 22 and 24 are vertically aligned and extend in opposite directions (approximately 180 degrees from one another), the fasteners 114 have been routed through the desired aligned through bores 70 for selecting the desired effective crank arm length $L_1$ (i.e., the distance between the pedal rotational axis 90 and the spindle rotational axis 94), and for selectively connecting the base member 40 to the crank arm member 44 in a non-rotational manner. As such, the force imparted on the pedals 28 and 30 in a direction substantially tangential to the pedal rotational axis, rotates the crank arms 22 and 24 about the spindle rotational axis, which in turn, rotates the chain ring 34. The rotation of the chain ring 34 is transmitted to the rear wheel W of the bicycle through a chain N.

Figure 10:
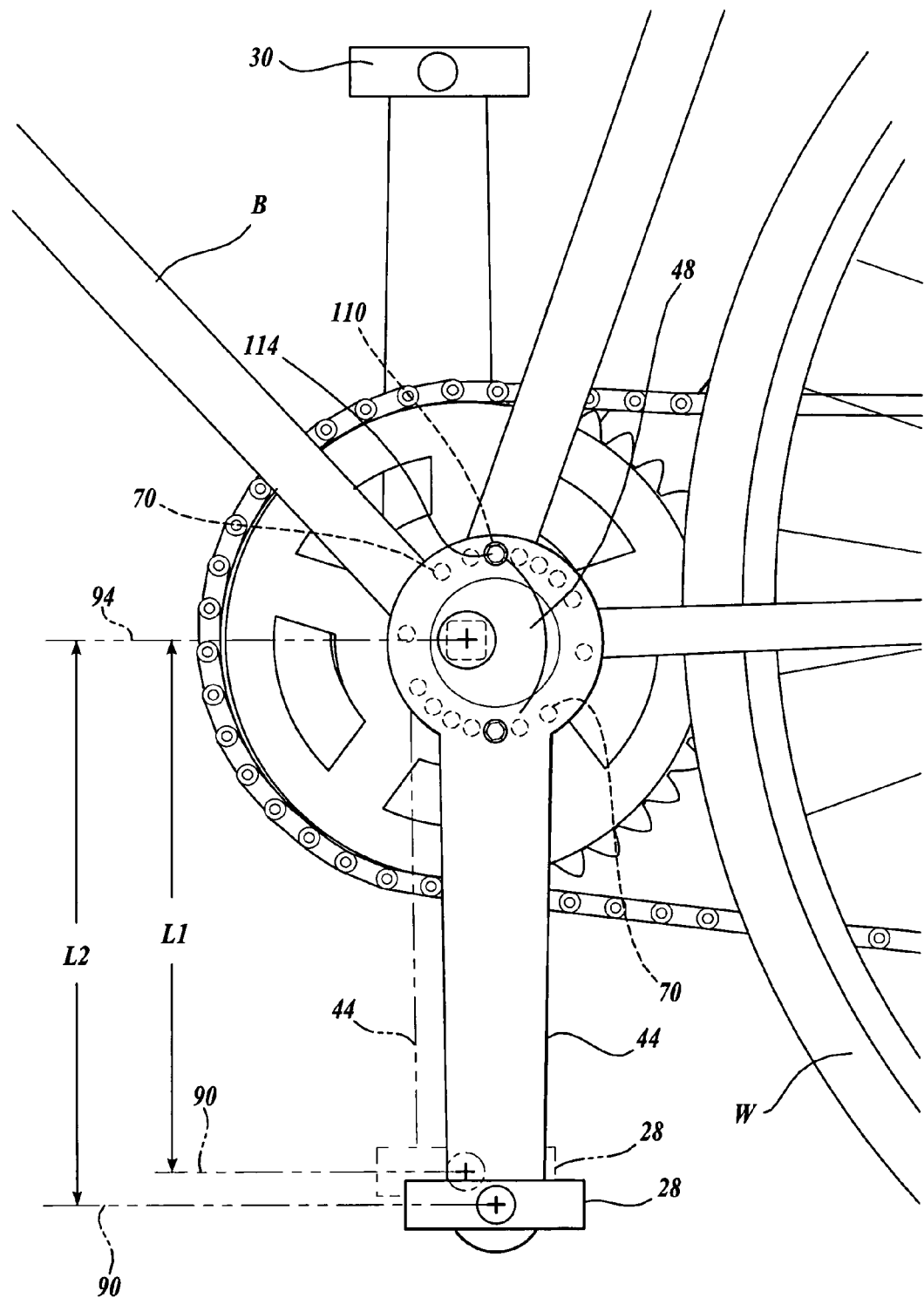
FIG. 10 is a side elevation view of a bicycle to which the crank arms of FIG. 2 are mounted, the crank arms having an effective crank arm length $L_2$.

FIG. 10 is a side elevational view of a bicycle to which the crank arms 22 and 24 are rotationally mounted. In FIG. 10, the crank arms 22 and 24 vertically extend in opposite directions (approximately 180 degrees from one another), and the fasteners 114 have been routed through the desired aligned through bores 70 for selecting the desired effective crank arm length $L_2$, which is greater than the effective length $L_1$ shown in phantom. To achieve the new desired effective crank arm length $L_2$ (i.e., the distance between the pedal rotational axis 90 and the spindle rotational axis 94) shown in FIG. 10, the following steps are performed. First, the fasteners 114 are removed and the crank arm member 44 is rotated about the first boss 48 until the fastener through bores 110 are aligned with the through bores 70 associated with the desired effective crank arm length $L_2$. Once the desired effective length $L_2$ of the crank arm has been selected and the through bores 110, 70 are aligned, the fasteners 114 are routed through the aligned through bores 110, 70 to couple the base member 40 to the crank arm member 44 so that the rotation of the crank arm member 44 is transmitted to the spindle (not shown) through the base member 40. Finally, the crank arm 22 is rotated downwardly to achieved the orientation shown in FIG. 10.

The change in effective lengths between $L_1$ and $L_2$ is caused by the eccentric relationship of the spindle rotational axis 94 (i.e., the axis of rotation of the crank arm 22 when the crank arm member 44 is coupled to the base member (hidden by the member 44 in FIG. 10) in a non-rotational manner, and the rotational axis RA (See FIGS. 8A–8C) of the crank arm member 44 (i.e., the axis of rotation of the crank arm member 44 about first boss 48 when the crank arm member 44 is coupled for rotation to the base member (hidden by the member 44 in FIG. 10)). As such, the crank arms of the present invention can change the length between the axes of the spindle and the pedal shaft just by changing the circumferential angular positions of the crank arm members with respect to the base members. It will be appreciated that the crank arm members may include index markings, such as lines or indicia, which cooperate with an index marking on the first bosses to aid in the alignment or selection of the desired effective crank arm lengths.

Figure 11:
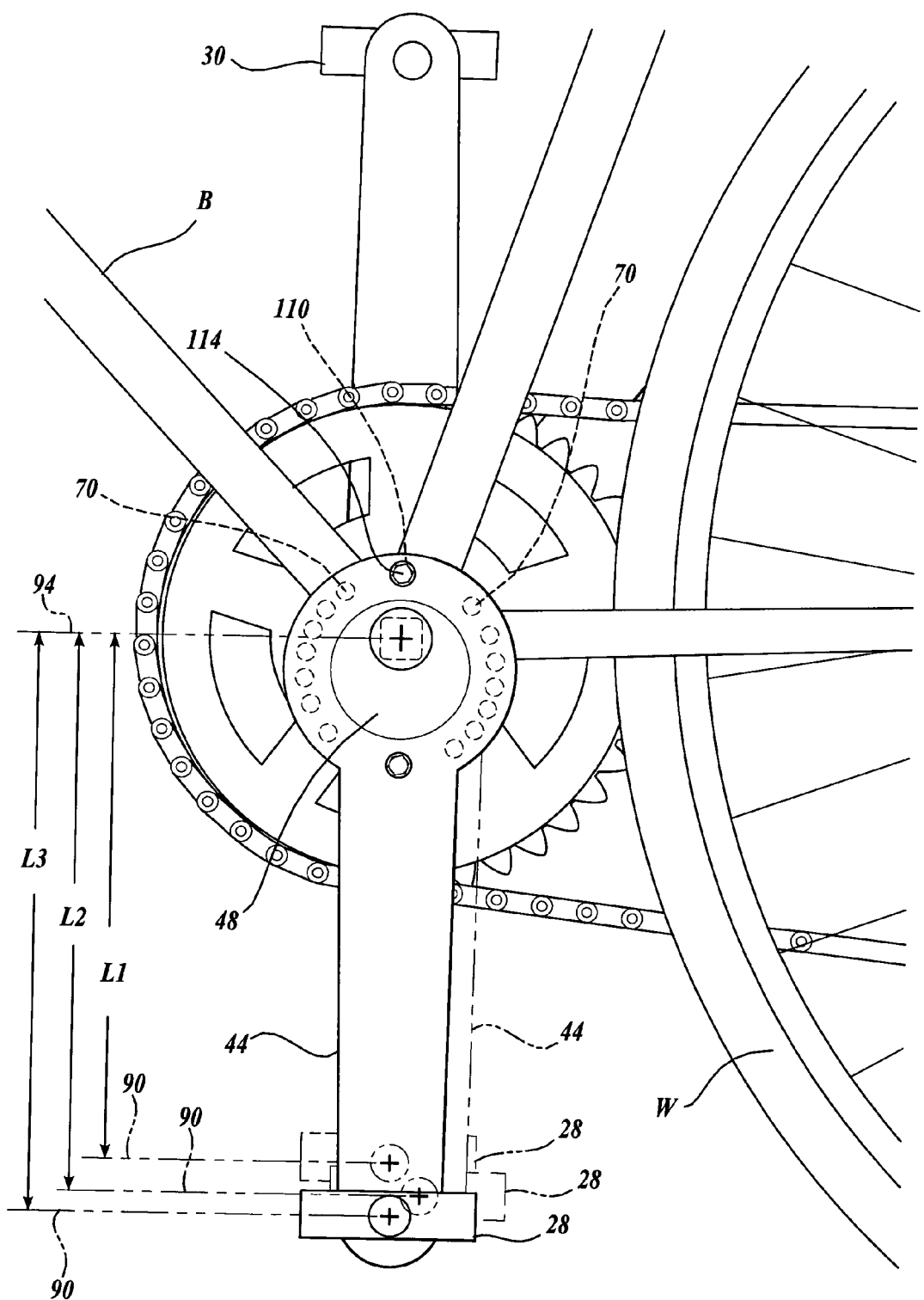
FIG. 11 is a side elevation view of a bicycle to which the crank arms of FIG. 2 are mounted, the crank arms having an effective crank arm length $L_3$.

FIG. 11 is a side elevational view of a bicycle to which the crank arms 22 and 24 are rotationally mounted. In FIG. 11, the crank arms 22 and 24 are vertically aligned and extend in opposite directions (approximately 180 degrees from one another), the fasteners 114 have been routed through the desired aligned through bores 70 for selecting the desired effective crank arm length $L_3$, which is greater than the effective lengths $L_1$ and $L_2$ shown in phantom. To achieve the new desired effective crank arm length $L_3$ shown in FIG. 11, the steps described above for the effective crank length $L_2$ are repeated, except for the fastener through bores 110 are aligned with the through bores 70 associated with the desired effective crank arm length $L_3$.

Due to the ease of adjusting the effective crank arm length, the crank arms of the present invention have many applications, a few of which will now be described. First, the crank arms of the present invention may be attached to a bicycle so that the rider can easily and effectively alter the effective length of the crank arms during normal training to determine which crank length provides the best feel and performance. Once the specific effective crank arm length is determined by the rider, the rider may switch to a fixed length crank arm having the desired effective crank arm length, or the crank arms of the present invention may remain on the bicycle at the desired effective crank length. Additionally, a custom frame or bicycle builder may utilize the crank arms of the present invention when designing a custom frame for a customer. The present invention allows the custom frame builder to vary the effective crank length, in conjunction with varying the frame size and frame geometry, to provide the customer with the optimal bicycle configuration.

Further, the crank arms of the present invention may be used with stationary bicycle trainers, such as the one described in U.S. patent application Ser. No. 09/718,885, filed Nov. 21, 2000, the disclosure of which is hereby incorporated by reference. The crank arms of the present invention, when used in conjunction with such a trainer can provide a quantitative measure as to what crank arm length the rider is more efficient. For example, the aforementioned trainer can output a constant resistance load, e.g., 200 watts at a constant RPM. During sessions testing each effective crank arm length, the rider exercises at a constant load, and a constant RPM, and their heart rate is measured. The optimum crank length will result in which crank arm length was associated with the lowest recorded heart rate.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An adjustable length crank arm, comprising:
a first member having a spindle bore sized and configured to be connectable to a spindle and defining a spindle rotational axis; and
an elongate second member rotatably connected at one end to said first member and having a mounting bore disposed at the opposite end of said second member, said mounting bore being adapted to be connected to a pedal shaft and defining a pedal rotational axis spaced a distance X from said spindle rotational axis and parallel therewith, said second member selectively rotatable between at least two pre-selected positions about a rotational axis eccentric with respect to said spindle rotational axis, wherein said pre-selected positions of said second member vary said distance X between said spindle rotational axis and said pedal rotational axis.

2. The adjustable length crank arm of claim 1, wherein said first member includes a cylindrically shaped first boss, said second member rotatably connected to said first boss.

3. The adjustable length crank arm of claim 2, wherein said first member further comprises a second boss protruding from a side of said first member opposite of said first boss.

4. The adjustable length crank arm of claim 2, wherein said first boss is concentrically arranged on said first member.

5. The adjustable length crank arm of claim 2, wherein said first member includes at least two through bores having centers disposed radially outward of the perimeter of said first boss and centered on an imaginary circle having a pre-selected diameter.

6. The adjustable length crank arm of claim 5, wherein said at least two through bores are threaded.

7. The adjustable length crank arm of claim 5, wherein said second member includes at least one fastener through bore alignable with said first member through bores.

8. The adjustable length crank arm of claim 7, further including at least one fastener for selectively coupling said first member to said second member for rotation therewith.

9. The adjustable length crank arm of claim 8, wherein said fastener is operable to be routed through said fastener through bore in said second member and through one of said at least two first member through bores for selectively coupling said first member to said second member for rotation therewith.

10. The adjustable length crank arm of claim 5, wherein said first member through bores are a plurality of first member through bores, and wherein said plurality of first member through bores are separated a pre-selected distance around said imaginary circle.

11. The adjustable length crank arm of claim 1, further comprising a chain ring connected for rotation with said first member.

12. The adjustable length crank arm of claim 11, wherein said first member further includes a plurality of arms protruding outwardly from the center of said first member, said plurality of arms configured to connect to said chain ring.

13. A crank arm having an adjustable effective length, comprising:
a base member including a cylindrically shaped first boss, and a spindle bore sized and configured to be connectable to a spindle and defining a spindle rotational axis parallel and eccentric to an axis of said first boss; and
an elongate crank arm member journaled for rotation onto said first boss at one end and having a mounting bore disposed at the other end adapted to be connected to a pedal shaft and defining a pedal rotational axis spaced apart a distance from said spindle rotational axis and parallel therewith, said spaced apart distance defining an effective length of said crank arm, wherein said crank arm member is operable to be selectively rotated between a plurality of pre-selected positions about said axis of said first boss, and further operable to be selectively connected to said base member for rotation therewith, said effective length of said crank arm being adjustable as said crank arm member rotates between said plurality of pre-selected positions.

14. The crank arm of claim 13, further including at least one fastener for selectively connecting said base member to said crank arm member for rotation therewith.

15. The crank arm of claim 14, wherein said base member includes a plurality of through bores having centers disposed radially outward of the perimeter of said first boss, centered on an imaginary circle having a pre-selected diameter, and arranged a pre-selected distance apart, and wherein said crank arm member includes at least one fastener through bore alignable with said plurality of base member through bores, said fastener routable through said fastener through bore in said second member and through one of said plurality of base member through bores for selectively coupling said base member to said crank arm member for rotation therewith.

16. An adjustable length crank arm, comprising:
a disk shaped base member having a spindle facing side and a crank arm member facing side, said base member including a cylindrically shaped first boss having a cylindrical open cavity; a spindle through bore connected to said cavity, said spindle through bore adapted for receiving a spindle in a non-rotational manner and defining a spindle rotational axis; and at least two through bores having centers disposed radially outward of the perimeter of the first boss and centered on an imaginary circle having a pre-selected diameter;
a crank arm member having a spindle end and a pedal end, said spindle end of said crank arm member defining a cylindrical bore sized and configured for rotatably mounting the crank arm member onto said first boss and including at least one fastener through bore, said pedal end of said crank arm member defining a through bore adapted to be connected to a pedal shaft and defining a pedal rotational axis spaced a distance D from said spindle rotational axis, said crank arm member rotatable about said first boss for selectively aligning said fastener through bore with one of said base member through bores, said rotation of said crank arm member selectively changing said distance D; and at least one fastener received through said aligned fastener through bore and one of said base member through bores for selectively coupling said base member to said crank arm member for rotation therewith.

* * * * *